US006937322B2

(12) United States Patent
Gerz et al.

(10) Patent No.: US 6,937,322 B2
(45) Date of Patent: Aug. 30, 2005

(54) METHODS AND DEVICES FOR TESTING THE COLOR FASTNESS OF IMPRINTED OBJECTS

(75) Inventors: Christoph Gerz, Germering (DE); Klaus Thierauf, München (DE)

(73) Assignee: Giesecke & Devrient GmbH, Munich (DE)

( * ) Notice: Subject to any disclaimer, the term of this patent is extended or adjusted under 35 U.S.C. 154(b) by 56 days.

(21) Appl. No.: 10/203,618

(22) PCT Filed: Feb. 19, 2001

(86) PCT No.: PCT/EP01/01844

§ 371 (c)(1),
(2), (4) Date: Nov. 7, 2002

(87) PCT Pub. No.: WO01/61654

PCT Pub. Date: Aug. 23, 2001

(65) Prior Publication Data

US 2003/0123049 A1 Jul. 3, 2003

(30) Foreign Application Priority Data

Feb. 21, 2000 (DE) ........................................ 100 07 887

(51) Int. Cl.[7] .......................... G06K 9/74; G06K 11/00; G01L 5/00

(52) U.S. Cl. ....................... 356/71; 250/338.1; 250/556

(58) Field of Search ............................ 356/71; 250/556, 250/338.1

(56) References Cited

U.S. PATENT DOCUMENTS

| | | | | |
|---|---|---|---|---|
| 3,491,243 | A | 1/1970 | Tsugami | |
| 3,679,314 | A | 7/1972 | Mustert | |
| 3,916,194 | A | 10/1975 | Novak et al. | |
| 3,942,154 | A | 3/1976 | Akami et al. | |
| 4,041,456 | A | 8/1977 | Ott et al. | |
| 4,184,081 | A | 1/1980 | Bergamini | |
| 4,587,434 | A | 5/1986 | Roes et al. | |
| 4,592,090 | A | 5/1986 | Curl et al. | |
| 5,005,873 | A | 4/1991 | West | |
| 5,027,415 | A | 6/1991 | Hara et al. | |
| 5,781,676 | A | 7/1998 | Okada | |
| 6,163,034 | A | * 12/2000 | Khvostov | 250/556 |

FOREIGN PATENT DOCUMENTS

| | | |
|---|---|---|
| CH | 1470737 | 4/1977 |
| DE | 23 20 731 | 11/1973 |
| DE | 24 40 552 | 1/1976 |
| DE | 19701513 | 7/1998 |
| GB | 1439173 | 6/1976 |
| GB | 2 355 522 A | 4/2001 |
| JP | 52-1192 | 1/1977 |
| RU | 2 091 762 C1 | 9/1997 |
| RU | 2 123 722 C1 | 12/1998 |
| WO | WO 94/16412 | 7/1994 |

OTHER PUBLICATIONS

Patent Abstracts of Japan, vol. 1998, No. 1, Jan. 30, 1988, Japan 09 231435 A, Sep. 5, 1997.
Patent Abstracts of Japan, vol. 1998, No. 10, Aug. 31, 1998, Japan 10 143 704 A, May 29, 1998.

* cited by examiner

*Primary Examiner*—Gregory J. Toatley, Jr.
*Assistant Examiner*—Amanda Merlino
(74) *Attorney, Agent, or Firm*—Bacon & Thomas, PLLC

(57) ABSTRACT

Methods and apparatuses for testing the authenticity of objects printed with security link are provided which measure light emanating from, in particular reflected or transmitted by, an object to be checked. To guarantee especially reliable authenticity testing, it is provided that light emanating from the object to be checked is detected indifferent spectral regions outside the visible spectral region. To obtain easily operated and safe authenticity testing, it is provided that light emanating from the object is detected at a plurality of places on the object in at least two selected spectral regions. A test series is produced for each spectral region wherein two test series adapted to each other, and authenticity testing is then performed by comparing the adapted two test series.

24 Claims, 3 Drawing Sheets

METHODS AND DEVICES FOR TESTING THE COLOR FASTNESS OF IMPRINTED OBJECTS

BACKGROUND

This invention relates to methods and apparatuses for testing the authenticity of printed objects, in particular printed sheet material, by measuring light emanating from, in particular reflected or transmitted by, an object to be checked.

To increase forgery-proofness, objects, in particular bank notes, security documents, identification documents or documents of value, are printed in certain surface areas with suitable security inks that convey a certain color effect in the visible spectral region, i.e. in the wavelength region between about 400 nanometers and about 800 nanometers, and additionally have a reflection or transmission behavior characteristic of the particular security ink in invisible, e.g. ultraviolet or infrared, spectral regions. If a security document is imitated with the aid of a color copier, for example, the visible color effect of a printed surface area can be basically reproduced. However, since customary color particles do not have the spectral behavior in invisible spectral regions characteristic of special security inks, counterfeit security documents can generally be recognized by accordingly measuring their reflection or transmission behavior in invisible spectral regions.

Laid-open print JP 52-11992 describes a method and apparatus for testing the authenticity of bank notes. A bank note is irradiated with light from a broad-band light source. Light reflected or transmitted by a place on the bank note is measured in the visible and infrared spectral regions with two photodetectors of different spectral sensitivity. The output signals of the two photodetectors are amplified in a differential amplifier and evaluated in a following threshold and logic circuit. If the difference between the two output signals is within a predetermined range, the logic circuit delivers a binary signal that confirms authenticity or indicates a forgery. This check can be repeated at a plurality of places on the bank note, the authenticity of the note being confirmed when a corresponding signal is delivered by the logic circuit at all or most places.

This method has the disadvantage that the predetermined range of values must be readjusted in the course of the operating lifetime of the apparatus since the sensitivity or dark current of the two photodetectors generally changes to different extents due to aging effects so that the difference of the signals varies. In addition, this method can deliver false results when testing the authenticity in particular of documents soiled in some places or in the case of noisy measuring signals, since only binary evaluation of the difference of the two output signals and thus a yes/no decision on the authenticity of the document to be checked is effected at each place on the document to be checked.

Measurement with two photodetectors one of which is sensitive in the visible spectral region and the other in the infrared is moreover only suitable for testing printing inks having a steplike reflection or transmission course in the transition area between the visible and infrared spectral regions and a substantially constant course in the infrared spectral region.

In the method disclosed in U.S. Pat. No. 3,491,243 the printed sheet material under test is illuminated with white light and the light reflected or transmitted by individual color areas of the sheet material detected by cells sensitive in the visible spectral region that each consist of a photoconductive element with a certain spectral sensitivity and a color filter disposed therebefore with a certain spectral permeability. The material used for the photoconductive elements is for example cadmium sulfide (CdS), which is sensitive to wavelengths below about 550 nanometers. The size of the area to be measured on the printed sheet material can be defined by a convergent lens mounted on a tubular casing.

By this measuring principle only the color of the sheet material is detected and checked by machine. This has the disadvantage that an imitation document showing the same color effect as a real document upon a visual inspection with the human eye cannot be recognized as a forgery using this measuring principle.

In addition, defining the size of the area to be measured on the sheet material by a lens mounted on the tubular casing is bulky and therefore opposes the requirement of a structure as compact as possible. In particular, a change of geometry involving high adjustment effort is required for every desired change of size of the area to be measured on the sheet material.

SUMMARY

It is the problem of the invention to state a method allowing reliable and easily operated authenticity testing. In addition an apparatus is to be stated that permits reliable authenticity testing, has a compact structure and is easy to operate.

The individual solutions of the problem posed are based on the common inventive idea of selecting suitable spectral and/or spatial sections of a printed object and using them for testing the authenticity of the object. The corresponding methods and apparatuses permit reliable and easily operated authenticity testing along with a simple structure.

According to the invention it is provided in a method that light emanating from at least one place on the object to be checked is detected in spectral regions outside the visible spectral region.

This permits particularly precise determination of the spectral transmission or reflection behavior of the printed object to be checked in invisible spectral regions. It improves the methods known from the prior art to the effect that not only simple, e.g. steplike, spectral courses in a transition area between the visible and an invisible spectral region can be reliably detected but also any other type of spectral course in invisible spectral regions. It is thus in particular possible to detect special forgery-proof security inks having a spectral course in invisible spectral regions characteristic of the particular type of security ink. Testing the authenticity of objects printed with such special security inks using the methods known from the prior art, however, would yield insufficiently precise results.

Especially high ease of operation and reliability in testing the authenticity of printed objects is attained in particular by producing a test series for each defined spectral region and effecting the authenticity testing by comparing the produced test series. series. In advantageous fashion, two test series can additionally be adapted and then evaluated, as described in more detail below.

Another aspect of an inventive method for solving the problem posed consists in effecting the detection of light emanating from a printed object at a plurality of places on the object and producing a measured value for each defined spectral region at each place. Measurement is effected both on places located within a certain surface area of the object printed with security ink and on places located outside said surface area and generally only printed with an ink without any characteristic course in the defined spectral regions.

For each defined spectral region there are first and second test series consisting of the corresponding measured values. Light emanating from the object can be reflected, in particular diffusely reflected, and/or transmitted light. The actual authenticity testing is effected using the first and second test series. The two test series are for this purpose adapted to each other by converting the measured values of the first test series into values of an adapted series. The values of the adapted series have the property of deviating only slightly from the values of the second test series in defined areas. The stated defined areas are defined by the first and second test series having substantially an identical qualitative course there. The substantially identical qualitative course in the defined areas generally results from the spectral behavior of the printed object outside the surface area.

After adaptation of the two test series, the adapted series can be compared with the second test series to determine with high precision the surface area where the spectral behavior differs from the other areas of the printed object, and corresponding evaluation and authenticity testing by comparing the two adapted test series in this area can be effected.

The inventive method eliminates the influence of time-variant dark currents, amplification factors and sensitivities of the particular photodetectors. The spectral behavior of the surface area differing in the defined spectral regions can thus be analyzed quantitatively by e.g. forming the ratio or the difference of the two adapted series. This leads to reliable authenticity testing, on the one hand, and guarantees a high degree of high degree of ease of operation, on the other hand, since no adaptation of parameters for evaluation, such as threshold values for the difference of two detector signals, is necessary since the adaptation of the two test series for each object under test eliminates time-variant influences. In addition, falsification of the test result, in particular by locally limited soiling on the printed object, is clearly reduced since the influence of soiling is averaged out by the adaptation of the test series, in particular with the inclusion of measured values outside locally limited soiled areas.

An embodiment of an apparatus for testing the authenticity of printed objects is characterized in that the detection units provided for detecting light emanating from the object are sensitive in defined spectral regions outside the visible spectral region. The detection units can be in particular photosensitive elements, such as photodiodes, that are sensitive in the defined spectral regions. Optionally, a filter can be disposed before one or more photosensitive elements for additionally influencing the spectral sensitivity of the particular detection unit. Altogether, the inventive apparatus allows an especially compact, simple and cost-effective structure since it requires no additional, spectrally resolving optical elements, such as prisms, grids or the like. A further advantage is that the implementation of the individual components of the inventive apparatus involves very low effort for adjusting said components.

The inventive apparatus can be realized especially simply and cost-effectively if the light source provided for irradiating the object under examination has a broad-band spectrum that at least partly includes the defined spectral regions. Incandescent lamps are suitable, for example. This makes it unnecessary to use different individual light sources, such as light-emitting diodes with different spectral emission.

An especially preferred embodiment of the inventive apparatus provides that the detection units have side-by-side photosensitive elements. The photosensitive elements can be so disposed e.g. on a common carrier that the edges of the photosensitive elements adjoin. The carrier can be a ceramic substrate, for example. An advantage of these close side-by-side photosensitive elements is that any parallactic errors due to different positions of the elements are kept very low, i.e. both photosensitive elements see approximately the same detail of the object to be checked.

In a further preferred embodiment of the invention, parallactic errors can be avoided practically completely by the photosensitive elements being tandem mounted. The type and order of the elements is to be selected so that each photosensitive element is permeable to the light to be detected with the particular photosensitive elements therebehind. In a detector with for example two semiconductor-based elements sensitive in the infrared spectral region, a first element is thus disposed before a second element, the semiconductor material of the first element being selected so that its absorption edge is at smaller wavelengths than is the case with the semiconductor material of the second element therebehind.

A further aspect of an inventive apparatus for solving the problem posed is characterized in providing between object and detector at least one diaphragm for adjusting the size of an area to be measured on the object from which the light emanating from the object is detected by the detector. This makes it possible to realize an especially compact and cost-effective apparatus wherein the size of the area to be measured can be defined selectively and simply by the opening of the diaphragm and its distance from the object or detector. Distances and type of diaphragm are preferably to be selected so that the area to be measured on the object is large compared to irregularities on the object, for example creases, but small compared to surface areas on the object within which a characteristic spectral behavior is to be detected.

BRIEF DESCRIPTION OF THE DRAWINGS

The invention will now be explained in more detail with reference to examples shown in figures, in which.

DESCRIPTION OF VARIOUS EMBODIMENTS

Figure 1:
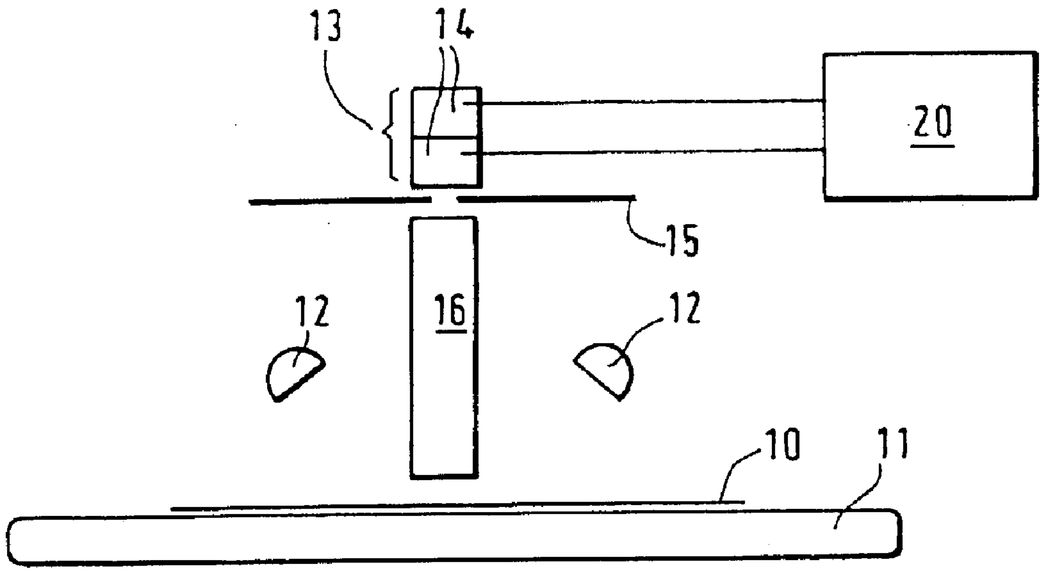
FIG. 1 shows the schematic structure of an inventive apparatus.

FIG. 1 shows the schematic structure of an inventive apparatus. Printed object 10 to be checked is irradiated with light from two light sources 12. Light sources 12 used are preferably ones having a broad-band spectrum containing not only components in the visible spectral region but also components in invisible spectral regions, such as UV and/or infrared light. Light emanating from light sources 12 is at least partly reflected by object 10 to be checked, and imaged by focusing device 16 into the plane of diaphragm 15, the light passing through the diaphragm opening hitting detector 13. Focusing device 16 used preferably comprises self-focusing lenses. Self-focusing lenses are cylindrical optical elements made of material having a refractive index decreasing from the optical axis of the cylinder toward the surface thereof. Use of such a lens permits the area to be measured to be imaged onto the detection unit in one-to-one fashion, free from adjustment and independently of the distance between object and detector.

For selectively defining the size of an area to be measured on object 10 for a measuring process, diaphragm 15 is disposed in the beam path, being formed as a pin diaphragm in this example.

Detector 13 consists in the shown example of two tandem mounted detection units 14 each sensitive in different spectral regions. Detection units 14 each contain a photosensitive element, the photosensitive element closer to object 10 being permeable to those spectral regions in which the element therebehind is sensitive. The output signals produced by the photosensitive elements pass into evaluation unit 20 and are further processed there for testing the authenticity of object 10. Optionally, object 10 to be checked can be transported past the total sensor apparatus on transport device 11 (shown very schematically here). Object 10 can thus be transported for example at a certain transport speed, detector 13 performing a measurement of light reflected by object 10 at certain time intervals. Object 10 is thus scanned in the form of a track of side-by-side or possibly overlapping individual space domains of individual measurements. By corresponding storage of the measured values determined during measure-measurement at one place for the two defined spectral regions, a test series reflecting the reflection behavior of object 10 in dependence on the particular place of measurement is finally obtained for each of the two photosensitive elements.

Figure 2:
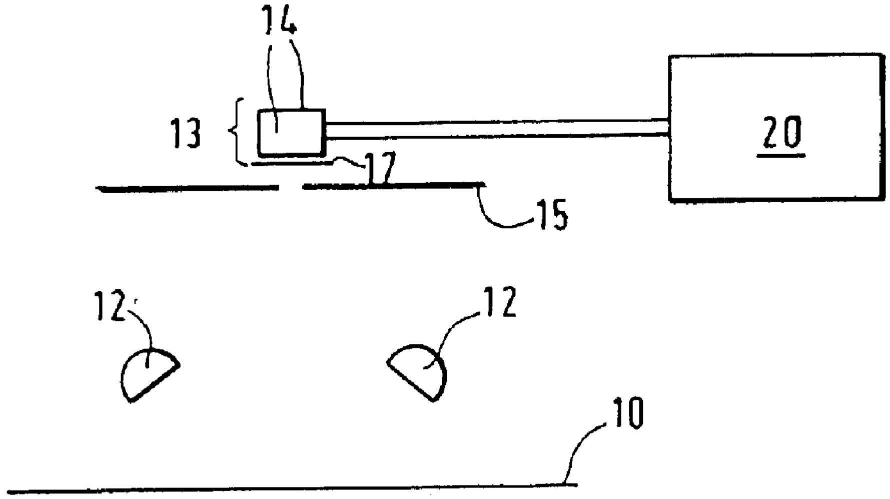
FIG. 2 shows the schematic structure of a further example of an inventive apparatus.

FIG. 2 shows the schematic structure of a further example of an inventive apparatus. Compared to the example explained in FIG. 1, detection units 14 of detector 13 are not mounted in tandem but side by side with respect to object 10 to be measured. In the representation chosen in FIG. 2, side-by-side detection units 14 should be imagined perpendicular to the plane of projection. Diaphragm 15 provided for limiting the area to be measured on object 10 is in this example preferably a slit diaphragm whose slit likewise extends perpendicular to the plane of projection. Selecting a sufficiently long diaphragm slit relative to the extension of the two side-by-side detection units 14 can minimize any parallactic errors that occur. If the slit length is sufficiently great, error sources during measurement and in the printed object itself in addition have a lesser effect. Such error sources are e.g. different positions of different objects to be checked relative to the measuring apparatus, production-related different positions of printed areas to be measured on the object and deviations in the cut, i.e. the shape and/or size, of the printed objects. By suitable selection of the position of diaphragm 15 between detector 13 and object 10, the size of the area to be measured on object 10 is likewise defined. In the shown example, diaphragm 15 is closer to detector 13 than to object 10, but the reverse case fundamentally also constitutes a preferred embodiment of the invention.

Filter 17 permeable only in the relevant spectral regions is disposed before detection units 14 in this example. For measurements with photovoltaic cells sensitive in the infrared spectral region, a customary filter can thus be used to eliminate the influence of accordingly shorter-wave light. Otherwise, the comments on FIG. 1 are applicable to this example.

In order to obtain especially reliable authenticity testing of objects printed with security inks, detection units 14 used in the shown examples can be photosensitive elements that are each sensitive in invisible spectral regions, e.g. in the infrared or ul-ultraviolet region. This obtains very precise and reliable determination of the spectral behavior hidden from the eye of object 10 under examination.

For authenticity testing on the basis of light from at least two spectral regions, light from one or more visible spectral regions can additionally be used according to the invention.

Figure 3:
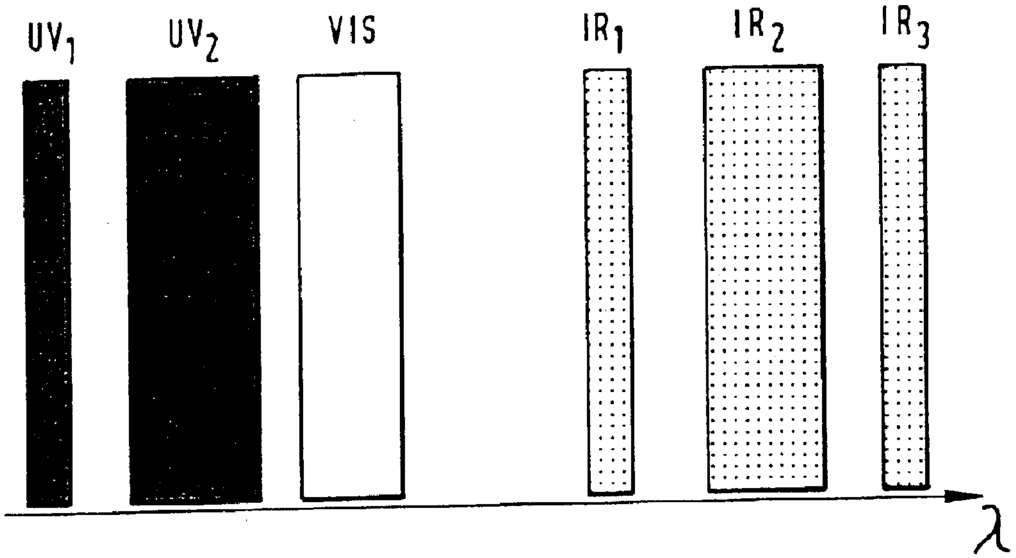
FIG. 3 shows different defined spectral regions.

FIG. 3 shows examples of defined spectral regions in which light emanating from object 10 to be checked is detected. In this qualitative diagram the individual spectral regions are plotted over wavelength $\lambda$ on a nonlinear scale. According to the invention, the spectral regions are outside the visible (VIS) spectral region. In the shown case, two of the defined spectral regions $UV_1$ and $UV_2$ are in the ultraviolet while the other spectral regions $IR_1$, $IR_2$ and $IR_3$ are in the infrared. As the example shows, the defined spectral regions ($UV_1$, $UV_2$, $IR_1$, $IR_2$, $IR_3$) can have a different spectral width. A different spectral width is of advantage when detection is to be effected e.g. in spectral regions where light emanating from object 10 has absorption courses, in particular absorption bands, of different width. It is fundamentally also possible for the defined spectral regions ($UV_1$, $UV_2$, $IR_1$, $IR_2$, $IR_3$) to partly overlap. Measurement of light emanating from object 10 to be checked in at least two of said defined spectral regions ($UV_1$, $UV_2$, $IR_1$, $IR_2$, $IR_3$) is effected via individual detection units 14 of detector 13 that are sensitive in the corresponding defined spectral regions ($UV_1$, $UV_2$, $IR_1$, $IR_2$, $IR_3$). For example, the spectral sensitivity of selected detection unit 14 can have a maximum in the corresponding spectral region ($UV_1$, $UV_2$, $IR_1$, $IR_2$, $IR_3$) or be substantially within the corresponding spectral region ($UV_1$, $UV_2$, $IR_1$, $IR_2$, $IR_3$). The width of a defined spectral region where light is to be detected can correspond substantially to the width of the spectral sensitivity of detection unit 14. A selection of individual defined spectral regions where light emanating from object 10 is to be detected is effected in accordance with the type of spectral behavior of the security ink to be checked. Thus, one can select e.g. two spectral regions in the ultraviolet ($UV_1$ and $UV_2$) or infrared ($IR_2$ and $IR_3$) or one spectral region in the ultraviolet ($UV_1$) and one in the infrared ($IR_2$).

Figure 4:
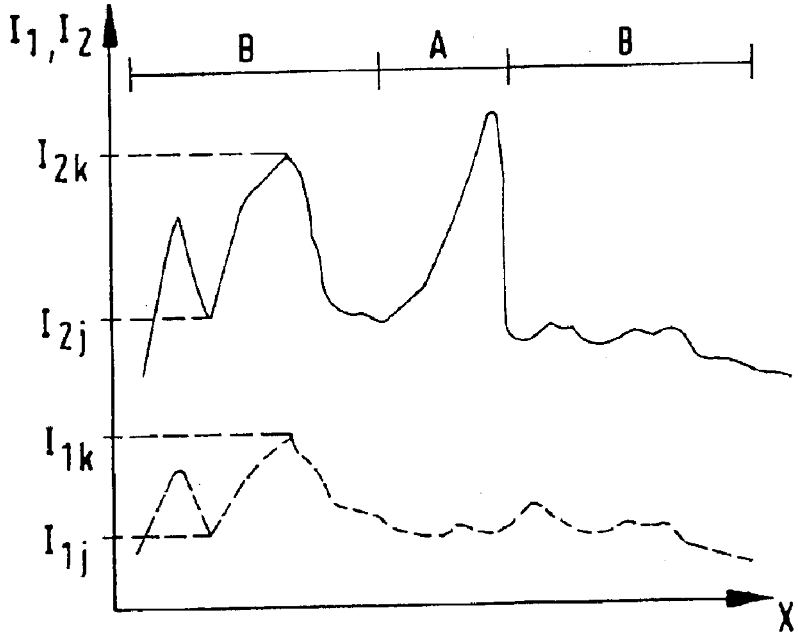
FIG. 4 shows two test series produced in different spectral regions.

FIG. 4 shows a diagram of two test series $I_1$ and $I_2$ determined in two different defined spectral regions, for example with one of the apparatuses described in FIGS. 1 and 2. The measured values of test series $I_1$ and $I_2$ are shown in dependence on their place X where they were detected on the object. As can be recognized in the diagram, the two test series $I_1$ and $I_2$ shown have areas B where the test series have a substantially identical qualitative course. In contrast, test series $I_1$ and $I_2$ clearly deviate qualitatively in area A. Test series $I_1$, and $I_2$ are adapted to each other according to the invention by converting test series $I_1$ so that its recalculated values differ only slightly in areas B from the values of second test series $I_2$.

The measured values of first test series $I_1$ are preferably converted into the values of adapted series $I'_1$ by a linear transformation which is performed by multiplying the values of first test series $I_1$ by first parameter $a_1$ and then adding second parameter $a_2$:

$$I'_1=a_1I_1+a_2.$$

This transformation takes account of different amplification factors or sensitivities by first parameter $a_1$, on the one hand, and offset errors, for example in the form of different dark currents in the detector units, by second parameter $a_2$, on the other hand. In addition, linear transformation is a conversion that can be easily realized by computing technology.

Parameters $a_1$ and $a_2$ are preferably determined from the measured values of test series $I_1$ and $I_2$ at places of local minimum $I_{1j}$ or $I_{2j}$ and adjacent local maximum $I_{1k}$ or $I_{2k}$ in defined area B. This method easily realized by computing technology allows especially simple and fast determination of parameters $a_1$ and $a_2$ required for adapting test series $I_1$ and $I_2$. The diagram of FIG. 4 shows by way of example places of local minima $I_{1j}$ and $I_{2j}$ and adjacent maxima $I_{1k}$ and $I_{2k}$ of test series $I_1$ and $I_2$. Parameters $a_1$ and $a_2$ required for adapting via a linear transformation of first test series $I_1$ are calculated as follows:

$$a_1=(I_{2k}-I_{2j})/(I_{1k}-I_{1j})$$

$$a_2=\langle I_2\rangle-a_1\langle I_1\rangle.$$

Variables $\langle I_1\rangle$ and $\langle I_2\rangle$ are the mean values of respective test series $I_1$ and $I_2$.

Alternatively, parameters $a_1$ and $a_2$ can also be determined by a so-called least-square-fit method. In a numerical method those parameters $a_1$ and $a_2$ are determined for which the sum of the square of the differences of the measured values of the adapted test series is minimized:

$$\Sigma(I_2-I'_1)^2=\text{minimal, where } I'_1=a_1I_1+a_2.$$

This method has the advantage of especially high precision in adapting the two test series since the determination of parameters $a_1$ and $a_2$ required for adapting is effected over all or at least a certain subdomain of the values of the two series.

It is especially advantageous if the determination of parameters $a_1$ and $a_2$ is effected in two runs. In a first run, adaptation of the test series is first performed over all measured values of test series $I_1$ and $I_2$. Adapted test series $I'_1$ and $I_2$ are then compared with each other, measured value area A being determined which substantially matches the surface area of the printed object and where adapted test series $I'_1$ and $I_2$ deviate. To permit the difference of the spectral reflection or transmission behavior of the printed object in said measured value area A to be analyzed especially precisely both quantitatively and qualitatively, another adaptation of test series $I_1$ and $I_2$ is then performed in a second run. However, in said second run, parameters $a_1$ and $a_2$ are only determined including those measured values that are outside certain measured value area A, i.e. over the measured values in areas B.

Figure 5:
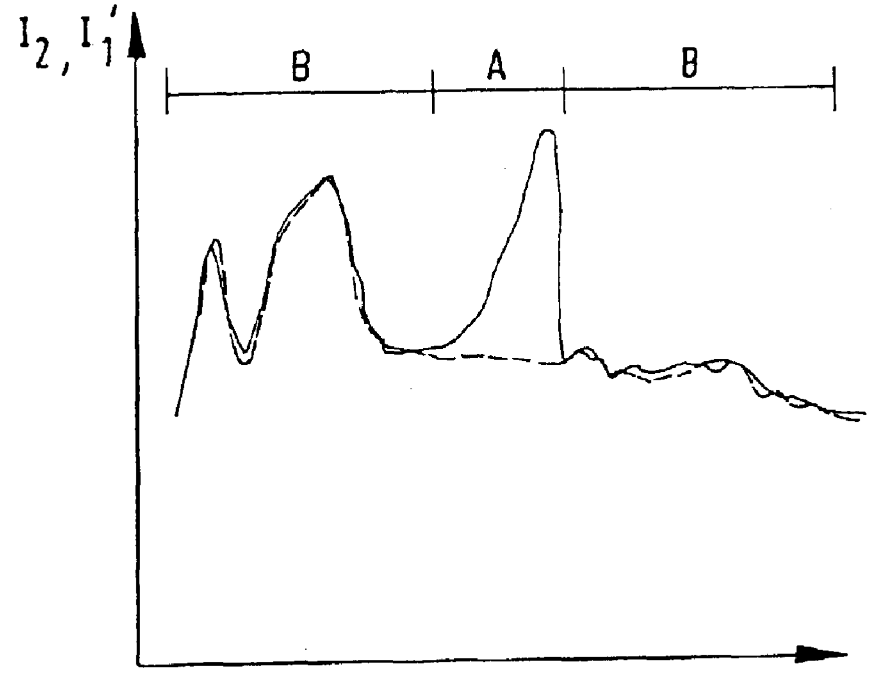
FIG. 5 shows the two test series from FIG. 4 after inventive adaptation.

The diagram shown in FIG. 5 shows adapted series $I'_1$ converted from test series $I_1$ as well as second test series $I_2$. As can be clearly recognized, the two series now deviate only slightly in areas B. In contrast, the deviation of adapted test series $I'_1$ and $I_2$ is clearly evident in area A. The clearly deviating course of adapted test series $I'_1$ and $I_2$ in area A can now be evaluated quantitatively.

Figure 6:
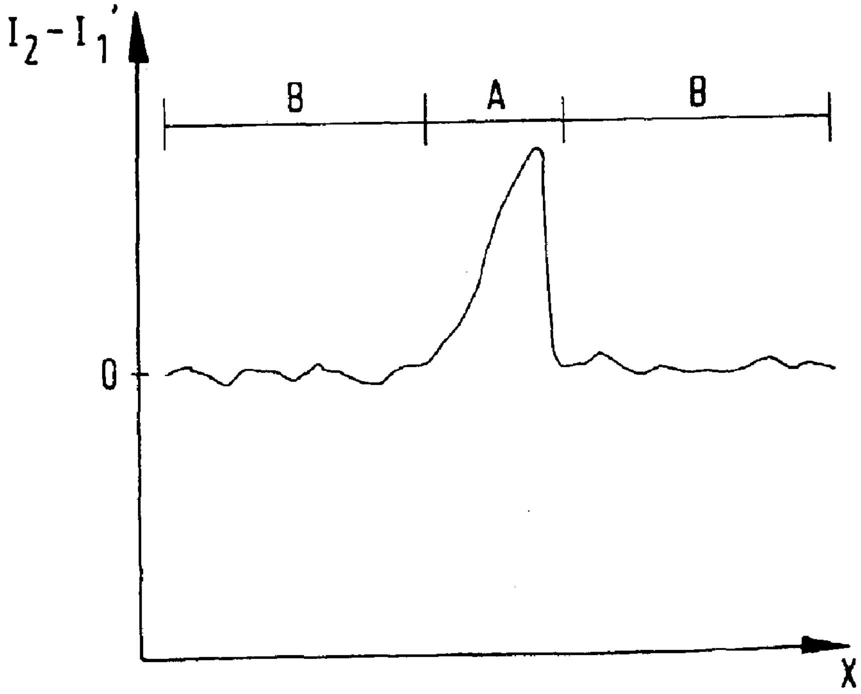
FIG. 6 shows the difference determined from the adapted test series from FIG. 5.

Quantitative evaluation can be effected for example by forming the difference between the two adapted test series $I_2-I'_1$. The result of such difference formation is shown in FIG. 6. The amount of the difference between the two adapted test series in area A can now be used for authenticity testing as a measure of a spectral behavior of the printed object under examination deviating in area A.

What is claimed is:

1. A method for testing the authenticity of printed objects by measuring light emanating from an object to be checked in at least two defined spectral regions, comprising:

the object to be checked is irradiated with light having a spectrum with components in the defined spectral regions, light emanating from the object to be checked is detected in the defined spectral regions, and authenticity testing is effected on the basis of the light detected in the defined spectral regions, said of light emanating from the object is effected at a plurality of places on the object so that a test series is produced from individual measured values for each defined spectral region, a first and second test series are adapted to each other by determining from the measured values of the first test series values of an adapted series that deviate only slightly from the values of the second test series in at least one area where the two test series have substantially an identical qualitative course, and said authenticity testing is effected by comparing the adapted test series.

2. The method according to claim 1, wherein conversion of the measured values of the first test series into the values of the adapted series is effected by a linear transformation, and the linear transformation is performed by multiplying the measured values of the first test series by a first parameter and then adding a second parameter.

3. The method according to claim 2, wherein the two parameters are determined from the measured values of the two test series at the places of a local minimum and a local maximum in the defined areas.

4. The method according to claim 2, wherein those parameters are determined for which the sum of the square of the differences of the values of the adapted test series is minimized.

5. The method according to claim 4, wherein the determination of the two parameters is effected in two runs, wherein in a first run, adaptation of the test series is effected by determining the two parameters from all measured values of the two test series, the adapted series are then compared with each other to determine a measured value area where the adapted series deviate from each other, and in a second run, another adaptation of the test series is effected by redetermining the two parameters, the two parameters being determined only from values of the two test series outside the certain measured value area.

6. The method according to claim 1, wherein comparison of the adapted test series is effected by subtracting the two series from each other.

7. Apparatus for testing the authenticity of printed objects by measuring light emanating from a object to be checked in at least two defined spectral regions comprising at least one light source for irradiating the object with light having components in the defined spectral regions, at least one detector for detecting light emanating from a same place of the object, the detector having detection units to detect light in at least the first and second spectral regions and each being sensitive in one of the defined spectral regions, wherein the defined spectral regions are different from one another and are outside the visible spectral region;

wherein the apparatus is adapted to detect light emanating from the same place of the object at a plurality of places so that a test series is produced from individual measured values for each defined spectral region and authenticity testing is effected using the test series.

8. Apparatus according to claim 7, wherein the light source has a broad-band spectrum at least partly including the defined spectral regions.

9. Apparatus according to claim 7, wherein at least one optical device is disposed between object and detector for focusing light emanating from the object and to be detected by the detector.

10. Apparatus according to claim 9, wherein the optical device contains a self-focusing lens.

11. Apparatus according to claim 7, wherein at least one diaphragm is provided between said object and said detector for adjusting the size of an area to be measured on the object from which light emanating from the object is detected by the detector.

12. Apparatus according to claim 7, wherein detection units of the detector have side-by-side photosensitive elements.

13. Apparatus according to claim 7, wherein the detection units of the detector have tandem mounted photosensitive elements, each photosensitive element being permeable to the light to be detected with the particular photosensitive elements therebehind.

14. Apparatus according to claim 12, wherein at least one optical filter is provided before at least one of the photosensitive elements of the detection units.

15. Apparatus according to claim 11, wherein the diaphragm has a round diaphragm opening.

16. Apparatus according to claim 11, wherein the diaphragm has a rectangular diaphragm opening.

17. Apparatus according to claim 7, wherein said at least two different defined spectral regions comprise at least two invisible spectral regions and at least one visible spectral region.

18. A method for testing the authenticity of printed objects by measuring light emanating from an object to be checked in at least two defined spectral regions, comprising:

irradiating the object with light having a spectrum with components in the defined spectral regions;

detecting light emanating from a plurality of places on the object in the defined spectral regions; and producing a test series from individual measured values for each defined spectral region, the test series produced on the basis of light detected in a first spectral region and the light detected in a second spectral region, both light detected in the first and second spectral regions emanating from the same place, at each of the plurality of places on the object;

wherein the first and second spectral regions are differently defined spectral regions and are outside the visible spectral region;

wherein authenticity testing is effected using the test series.

19. The method according to claim 18, wherein:

a first test series and a second test series are adapted to each other by determining from the measured values of the first test series values of a first adapted series that deviate only slightly from the values of the second test series in areas where the first and second test series have substantially an identical qualitative course; and authenticity testing is effected by comparing the first and second adapted test series with each other.

20. The method according to claim 19, wherein:

conversion of the measured values of the first test series into the values of the first adapted series is effected by a linear transformation; and the linear transformation is performed by multiplying the measured values of the first test series by a first parameter and then adding a second parameter.

21. The method according to claim 20, wherein the first and second parameters are determined from the measured values of the first and second test series at the places of a local minimum and a local maximum in the defined areas.

22. The method according to claim 20, wherein the first and second parameters are determined for which the sum of the square of the differences of the values of the first and second test series is minimized.

23. The method according to claim 22, wherein determination of the first and second parameters is effected into runs, wherein:

in a first run, adaptation of the first and second test series is effected by determining the first and second parameters from all measured values of the first and second test series;

the first and second series are then compared with each other to determine a measured value area where the first and second adapted series deviate from each other; and in a second run, another adaptation of the first and second test series is effected by redetermining the first and second parameters, the first and second parameters being determined only from values of the first and second test series outside the certain measured value area.

24. The method according to claim 23, wherein the comparison of the first and second adapted series is effected by subtracting the first and second series from each other.

* * * * *